US012289425B1

(12) United States Patent
Allen (10) Patent No.: US 12,289,425 B1
(45) Date of Patent: Apr. 29, 2025

(54) THREAT IDENTIFICATION AND RESPONSE SYSTEM FOR TELEPHONE CALLS

(71) Applicant: 911Inform LLC, Wall Township, NJ (US)

(72) Inventor: Ivo W. Allen, Freehold, NJ (US)

(73) Assignee: 911Inform LLC, Wall Township, NJ (US)

( * ) Notice: Subject to any disclaimer, the term of this patent is extended or adjusted under 35 U.S.C. 154(b) by 0 days.

(21) Appl. No.: 18/788,422

(22) Filed: Jul. 30, 2024

(51) Int. Cl.
*H04M 3/22* (2006.01)
*H04M 3/42* (2006.01)
*H04M 7/00* (2006.01)

(52) U.S. Cl.
CPC ..... *H04M 3/2281* (2013.01); *H04M 3/42221* (2013.01); *H04M 7/0078* (2013.01)

(58) Field of Classification Search
None
See application file for complete search history.

(56) References Cited

U.S. PATENT DOCUMENTS

| | | | | |
|---|---|---|---|---|
| 8,600,008 B2 * | 12/2013 | Kraus | ................... | H04W 4/024 |
| | | | | 379/40 |
| 9,185,217 B2 * | 11/2015 | Williams | .............. | H04L 51/214 |
| 2008/0189162 A1 * | 8/2008 | Ganong | ................ | G06F 16/958 |
| | | | | 701/300 |
| 2010/0008478 A1 * | 1/2010 | Arao | ...................... | H04M 11/04 |
| | | | | 379/37 |
| 2013/0005294 A1 * | 1/2013 | Levinson | ............. | G08B 25/005 |
| | | | | 455/404.1 |
| 2015/0156321 A1 * | 6/2015 | Abnett | .............. | H04M 3/42068 |
| | | | | 379/45 |

* cited by examiner

*Primary Examiner* — Quoc D Tran
(74) *Attorney, Agent, or Firm* — Morse, Barnes-Brown & Pendleton, P.C.; Sean D. Detweiler, Esq.

(57) ABSTRACT

A system and methodology for identifying and responding to threatening telephone calls include a client system with VoIP or MLTS multi-line telephone extensions featuring a threat indication capability and a service provider system configured to receive threat notifications from the telephone extensions, indicating a caller as a threat. Upon receiving a threat notification, the service provider system automatically initiates a threat response process during the call, including emergency notifications to authorities, call tracing, and call recording. After the call, the system creates a voiceprint and transcript of the threatening caller. Activation of the threat indication feature on a telephone extension triggers the threat notification, prompting the implementation of the threat response process to address potential threats effectively.

19 Claims, 8 Drawing Sheets

THREAT IDENTIFICATION AND RESPONSE SYSTEM FOR TELEPHONE CALLS

FIELD OF THE INVENTION

The present invention relates to internet protocol (VOIP) or MLTS multi-line telephone systems. In particular, the present invention relates to an internet protocol (VOIP) or MLTS multi-line telephone system that provides a threat indication feature.

BACKGROUND

Government institutions, businesses, as well as cultural and religious centers are increasingly under threat. As part of this, these and other establishments, and the people within them receive a growing number of telephone calls making institutional and personal threats against recipients of the calls.

Currently, the response to such threats can be complicated and cumbersome. Typically, the process of notifying the authorities and collecting the details of the call happens after the telephone call concludes, and as a result, a lot of information is lost. Each step in the response introduces points of failure, be it timeliness, or access to relevant facts and information. Any delay in response makes getting the details of the call, verifying the validity of the threat, and the ability to address a valid imminent threat, more difficult.

SUMMARY

There is a need for an improved way to identify a threat and notify the authorities at the time of a call. The present invention is directed toward further solutions to address this need, in addition to having other desirable characteristics. Specifically, the present invention provides systems and methods for identifying a telephone caller as a threat and providing call details and other relevant information to authorities in a substantially more efficient and accurate manner.

In accordance with embodiments of the present invention, a system for identifying a telephone caller as a threat and providing call details to authorities is provided. The system includes: a client system having a voice over internet protocol (VOIP) or MLTS multi-line telephone system providing one or more telephone extensions having a threat indication feature that when activated by a user initiates a threat notification and a service provider system supporting the voice over internet protocol (VOIP) or MLTS multi-line telephone system. The service provider system is configured to: receive the threat notification from one of the one or more telephone extensions indicating that the caller is a threat and in response to receiving the threat notification, automatically implement a threat response process including: at the time of the call: initiate an emergency notification to authorities, initiate a trace on the call from the caller, and initiate an audio recording of the call; and upon completion of the call: create a voiceprint of the caller indicated as a threat and create a transcript of the call. Activating the threat indication feature on one of the one or more telephone extensions triggers the threat notification, which causes implementation of the threat response process.

In accordance with aspects of the present invention, the threat indication feature is a threat button provided on the telephone connected to the extension. In some such aspects, the threat button is a software-implemented button, a hardware-implemented button, or combinations thereof.

In accordance with aspects of the present invention, the service provider system is further configured to: provide the authorities with one or more of: results of the call trace; the audio recording of the call; the voiceprint of the caller; and the transcript of the call. In some such aspects, an email is sent to the authorities containing a file of or a link to one or more of: results of the call trace, the audio recording of the call, the voiceprint of the caller, and the transcript of the call.

In accordance with aspects of the present invention, the service provider system is further configured to store one or more of: results of the call trace; the audio recording of the call; the voiceprint of the caller; and the transcript of the call.

In accordance with aspects of the present invention, the call trace includes a network trace.

In accordance with aspects of the present invention, the service provider system comprises a location service provider system configured to: maintain a location database containing geospatial location data for the one or more phone extensions and provide geospatial location data for the extension indicating a threat to the authorities.

In accordance with aspects of the present invention, the authorities comprise one or more of: a police department, fire department, emergency responder system, criminal investigator agency, and security agency.

In accordance with embodiments of the present invention, a method for identifying a telephone caller as a threat and providing call details to authorities is provided. The method includes: providing a voice over internet protocol (VOIP) or MLTS multi-line telephone system having one or more extensions having a threat indication feature that when activated by a user initiates a threat notification; receiving the threat notification from one of the one or more telephone extensions indicating that the caller is a threat. In response to receiving the threat notification, a threat response process is automatically implemented, the process including at the time of the call: initiating an emergency notification to authorities; initiating a trace on the call from the caller; and initiating an audio recording of the call. The process continues upon completion of the call: creating a voiceprint of the caller indicated as a threat; and creating a transcript of the call; wherein activating the threat indication feature on one of the one or more telephone extensions triggers the threat notification, which causes implementation of the threat response process.

In accordance with aspects of the present invention, the threat indication feature is a threat button provided on the telephone connected to the extension. In some such aspects, the threat button is a software-implemented button, a hardware-implemented button, or a combination thereof.

In accordance with aspects of the present invention, the method further includes providing the authorities with one or more of: results of the call trace; the audio recording of the call; the voiceprint of the caller; and the transcript of the call. In some such aspects, an email is sent to the authorities containing a file of or a link to one or more of results of the call trace, the audio recording of the call, the voiceprint of the caller, and the transcript of the call.

In accordance with aspects of the present invention, the method, further includes storing one or more of: results of the call trace; the audio recording of the call; the voiceprint of the caller; and the transcript of the call.

In accordance with aspects of the present invention, the call trace includes a network trace.

In accordance with aspects of the present invention, the method further includes maintaining a location database containing geospatial location data for the one or more phone extensions and providing geospatial location data for the extension indicating a threat to the authorities.

In accordance with aspects of the present invention, the authorities include one or more of a police department, fire department, emergency responder, criminal investigator agency, and security agency.

In accordance with aspects of the present invention, the method further includes registering the client system.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a system and methodology for identifying and responding to threatening telephone calls includes a client system with VoIP or MLTS multi-line telephone extensions featuring a threat indication capability and a service provider system configured to receive threat notifications from the telephone extensions, indicating a caller as a threat. Upon receiving a threat notification, the service provider system automatically initiates a threat response process during the call, including emergency notifications to authorities, call tracing, and call recording. After the call, the system creates a voiceprint and transcript of the threatening caller. Activation of the threat indication feature on a telephone extension triggers the threat notification, prompting the implementation of the threat response process to address potential threats effectively.

FIG. 1 through FIG. 8 wherein like parts are designated by like reference numerals throughout, illustrate an example embodiment or embodiments of a system and method for identifying a telephone caller as a threat and providing call details to authorities, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 1:
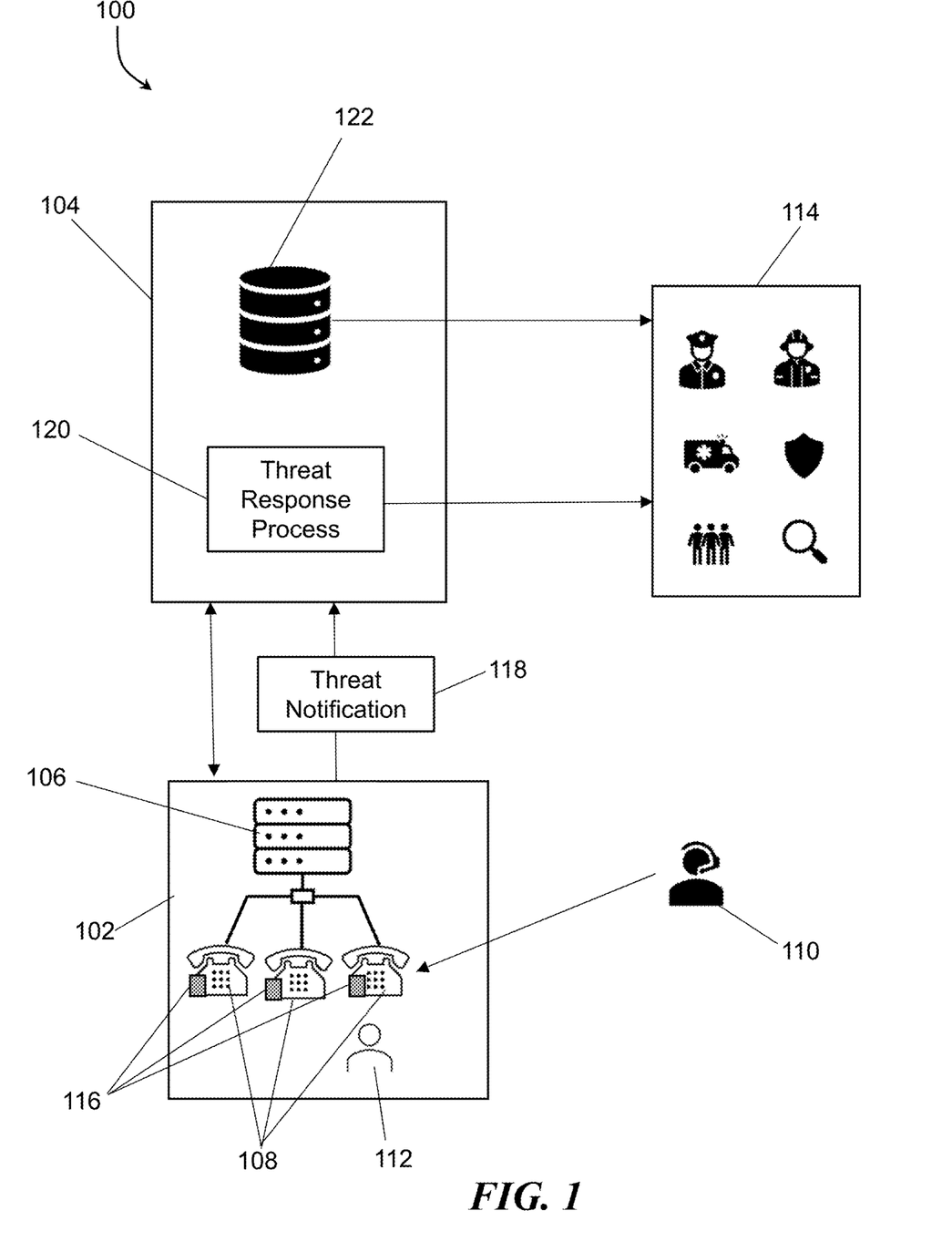
FIG. 1 is a diagrammatic illustration of an example system for providing escape routes in support of emergency call processing in accordance with embodiments of the present invention.
Figure 2:
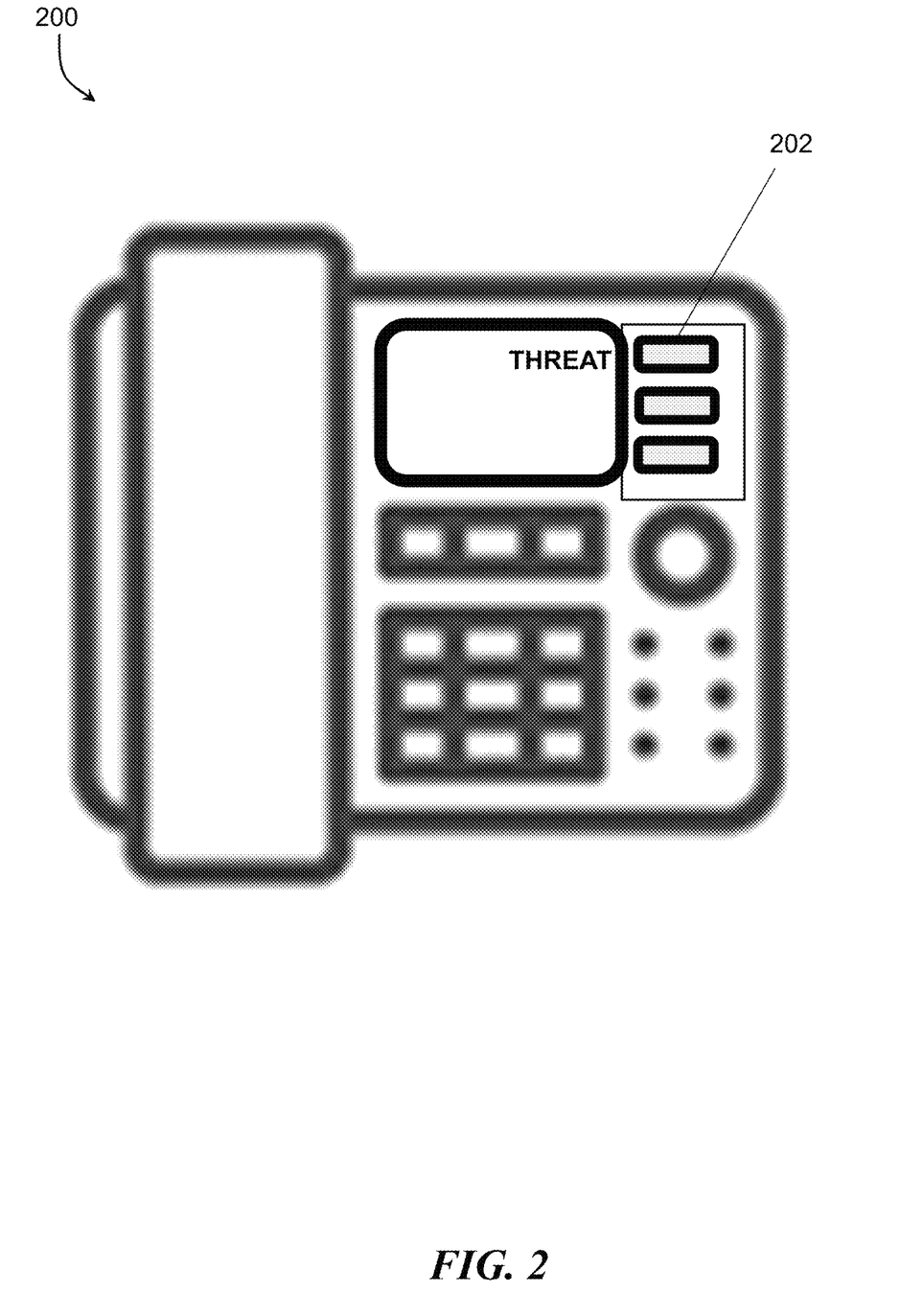
FIG. 2 is a diagrammatic illustration of an example telephone connected to an extension providing a threat button in accordance with embodiments of the present invention.

FIG. 1 depicts an example system 100 for implementing the present invention. The system 100 includes a client system 102 and a service provider system 104 in communication with the client system 102.

The client system 102 includes the hardware and software, such as a server, deployed at a client site that provides the functionality of the present system 100. The client may be a company, organization, venue, or other building, campus, facility, etc., and includes equivalents that would be appreciated by those of skill in the art. The client system 102 has a voice over internet protocol (VOIP) or MLTS multi-line telephone system 106 providing one or more telephone extensions 108 supported by the service provider system 104. The one or more extensions 108 could be located in one or more offices, on one or more floors of the client, or anywhere a telephone extension 108 is desired.

The service provider system 104 is the hardware and software, such as a server, deployed at a service provider that provides the functionality of the present system 100. The service provider may be remote or cloud based. In other embodiments, the service provider system 104 can be located at the client site or even part of the client system 102. It should be understood that these are mere examples of possible connectivity. Other configurations and connectivity will be apparent to one skilled in the art given the benefit of this disclosure and are considered to be equivalent.

The system 100 further includes a telephone caller 110, a user 112, and authorities 114. The telephone caller 110 is the entity that calls an extension 108 to interact with a user 112 answering an extension 108. The authorities 114 can include the police, fire department, emergency responders, federal agencies, security agencies, investigative agencies, or the like.

The system 100 is further configured to allow the user 112 to identify the telephone caller 110 as threat. The meaning of "threat" is conventional, e.g., an expression of intention to inflict evil, injury, or damage, and whether or not the intention is real is not as relevant as the situation where the user 111 simply needs to communicate that they believe the telephone caller 110 poses some kind of threat that would justify initiating the inventive process and looping in relevant authorities to help address the perceived threat. To achieve this functionality, each extension 108 has a threat indication feature 116 that when activated by the user 112 initiates a threat notification 118 while the service provider system 104 is configured to receive the threat notification 118 from one of the one or more telephone extensions 108 indicating that the caller 110 is a threat and in response to receiving the threat notification 118 automatically implementing a threat response process 120.

In some embodiments, the service provider system 104 may comprise a location service provider system that further includes and maintains a location database 122 comprising geospatial location data for the one or more extensions 108.

Activating the threat indication feature 116 of the one or more telephone extensions 108 triggers the threat notification 118, which causes implementation of the threat response process 120. In certain embodiments, the threat indication feature 116 is a threat button 202 provided on a telephone 200 connected to the extension 108. An example of this can be seen in FIG. 2. Here the threat indication feature 116 is a threat button 202 on the telephone 200. The telephone 200 is the interface where the user 112 has access to the extension 108, and can be a software-implemented telephone, a hardware-implemented telephone, or a combination thereof, as would be appreciated by those of skill in the art. Likewise, the threat button can be a software-implemented button, a hardware-implemented button, or a combination thereof (factoring in the embodiment of a hardware or software-implemented phone) as would be appreciated by those of skill in the art. Other implementations of a threat indication feature 116 will be apparent to one skilled in the art given the benefit of this disclosure.

Figure 3:
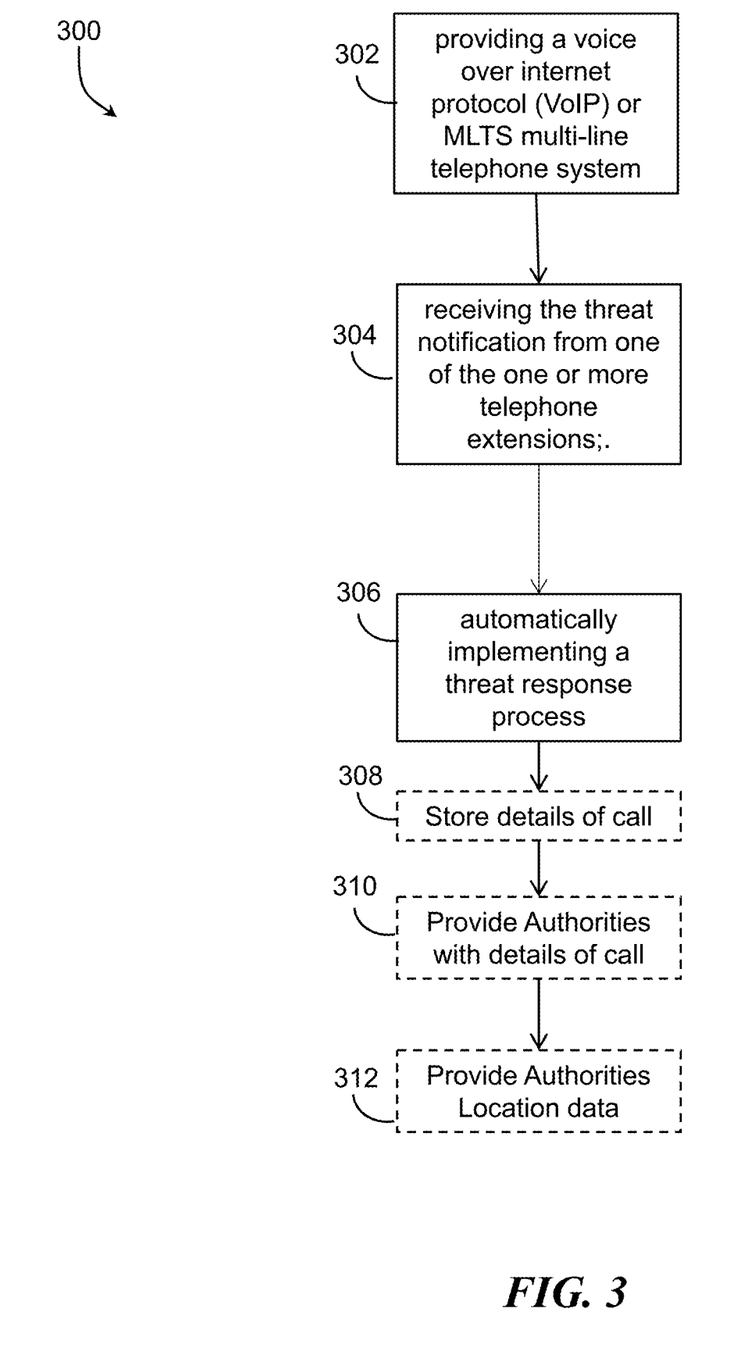
FIG. 3 is a flowchart depicting an example method for identifying a telephone caller as a threat and providing call details to authorities in accordance with embodiments of the present invention.

FIG. 3 is a flowchart 300 depicting a method of identifying a telephone caller as a threat and providing call details to authorities involving the components of FIG. 1. The method begins with providing the client system 102 a voice over internet protocol (VOIP) or MLTS multi-line telephone system 106 having one or more extensions 108 having a threat indication feature 116 (Step 302). When the user 112 activates the threat indication feature 116 a threat notification 118 is initiated. The threat notification 118 indicating that the caller 110 is a threat can then be received by the service provider system 104 (Step 304). In response to receiving the threat notification, the service provider system 104 automatically implements the threat response process 120 (Step 306).

Figure 4:
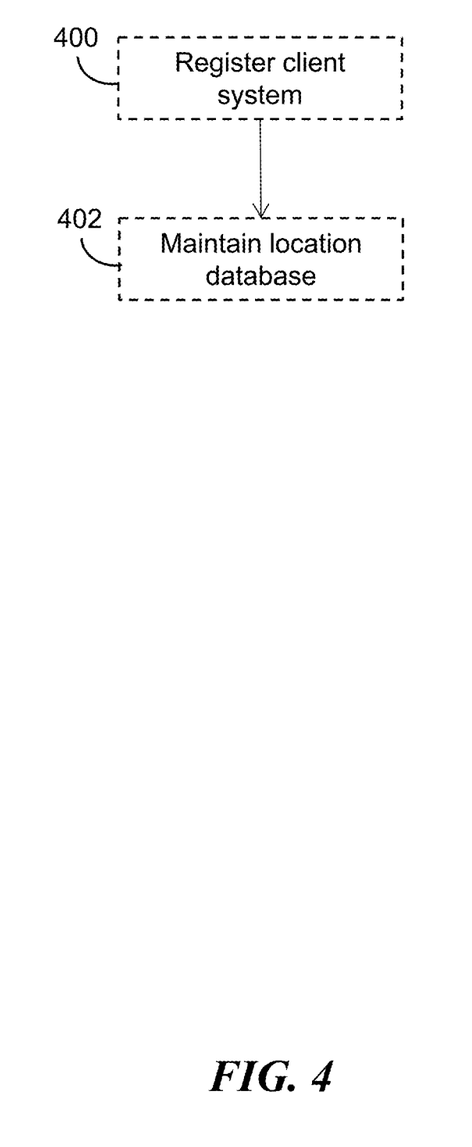
FIG. 4 is a flowchart depicting an example of additional steps that may be performed in support of providing a voice over internet protocol (VOIP) or MLTS multi-line telephone system in accordance with embodiments of the present invention.

FIG. 4 depicts some additional steps that may be performed by the service provider system 104 in support of the providing the client system 102 a voice over internet protocol (VOIP) or MLTS multi-line telephone system 106. The first additional step is registering the client system (Step 400). In this step the information about the client and their particular client system 102 including the number of extensions 108, the telephone numbers associated with the extensions, as well as protocols and permissions for the client and the client system 102 including the authorities 114 that may be notified in response to a threat notification 118. The next additional step is maintaining a location database containing geospatial location data for the one or more phone extensions 108 of the client site (Step 402). The geospatial location data can include one or more of: a country indication, a state indication, a street address, a floor designation, a room designation, and a floorplan indication.

Figure 5:
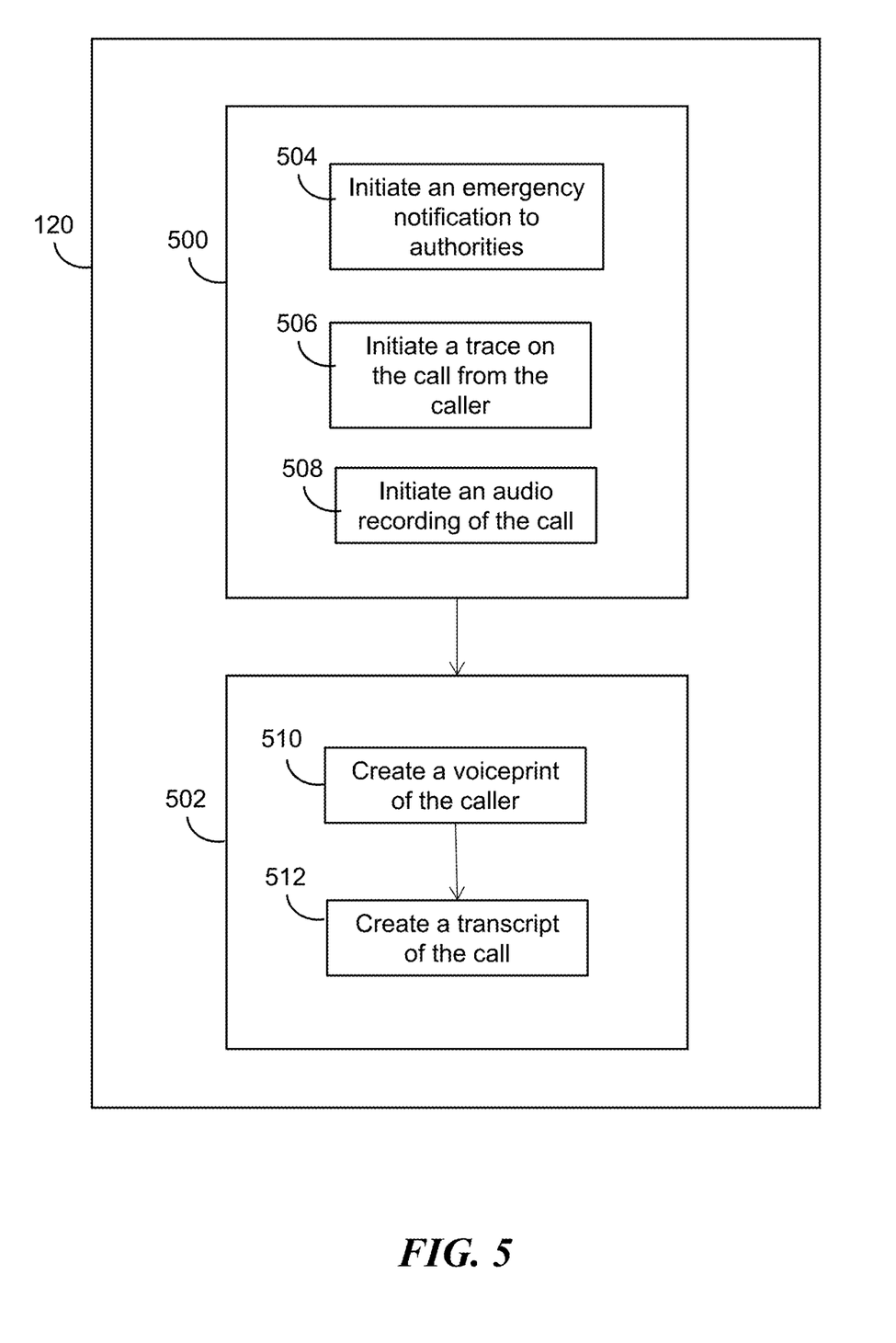
FIG. 5 is a flowchart depicting the steps involved in the threat response process in accordance with embodiments of the present invention.

FIG. 5 depicts the steps involved with the threat response process 120 that is automatically implemented (Step 306). The steps occur in two phases: at the time of the call (Block 500) and upon completion of the call (Block 502). The steps performed at the time of the call (Block 500) include initiating an emergency notification to authorities 114 (Step 504), initiating a trace on the call from the caller (Step 506), and initiating an audio recording of the call (step 508). The steps performed upon completion of the call (Block 502) include creating a voiceprint of the caller 110 indicated as a threat (Step 510) and creating a transcript of the call (Step 512). These steps are performed by parsing specific parameters within the body of the call enacted programmatically by the threat button 202 to retrieve information from the call and call logging system both during the call and upon call completion. Which authorities 114 are notified in (Step 504) may be dictated by the protocols and permissions for the client and the client system 102. The call trace will be able to show the number that originated the call, as well as the IP address of the origination point of the call, whether that be an individual or a carrier. All of this information will be placed within the call summary document for ease of access. With this information and public record/tracing tools, law enforcement can track down the call originator. In some embodiments, the trace of the call comprises a network trace. In certain embodiments, a call is recorded upon receiving a notification, in other embodiments, every call is recorded and the call indicated as a threat has the recording identified accordingly. Generating a voice print can be performed at the service provider system 104 or the recording of the call can be provided to a voice printing service. The transcript can be generated in a similar manner.

Figure 6:
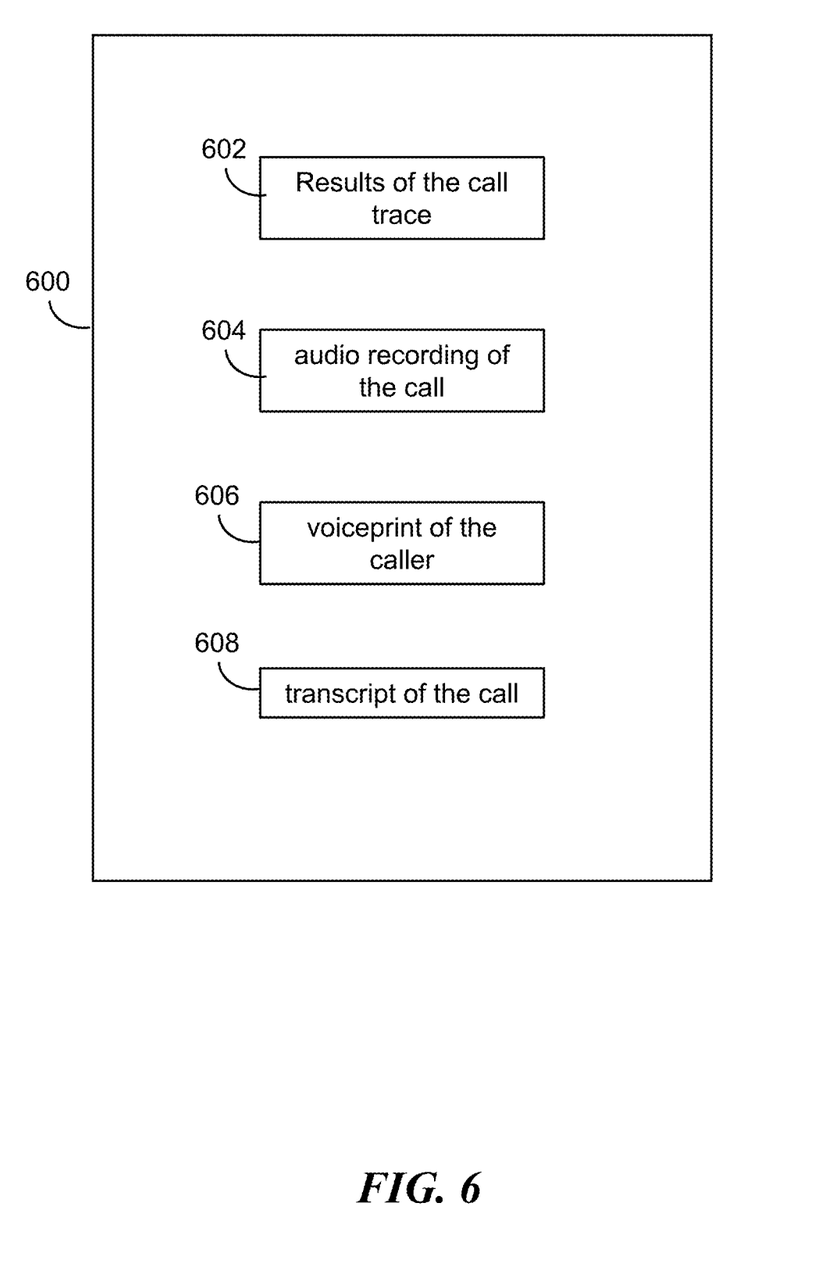
FIG. 6 is a diagrammatic illustration of the call details resulting from the threat response process in accordance with embodiments of the present invention.

FIG. 6 depicts the call details 600 created by the threat response process 120. These can include the results of the call trace 602, the audio recording of the call 604, the voiceprint of the caller 606, and the transcript of the call 608.

Referring back to the flowchart 300 of FIG. 3, in some embodiments, one or more additional steps may be performed. One such step is storing the details 600 of the call (step 308). This may involve storing one or more of the results of the call trace 602, the audio recording of the call 604, the voiceprint of the caller 606, and the transcript of the call 608. Once stored, the details 600 can be accessed as needed. Another possible step is providing the authorities 114 with the details of the call (Step 310). This may involve providing one or more of the results of the call trace 602, the audio recording of the call 604, the voiceprint of the caller 606, and the transcript of the call 608. Which details 600 are provided to which authorities 114 may be dictated by the protocols and permissions for the client and the client system 102. In some such embodiments, an email is sent to the authorities containing a file of or a link to one or more of: results of the call trace 602, the audio recording of the call 604, the voiceprint of the caller 606, and the transcript of the call 608. The authorities 114 may store the details 600 or add them to existing databases.

In embodiments where the service provider system 104 maintains a location database (Step 402) the method of FIG. 3 may involve providing geospatial location data for the extension 108 indicating a threat to the authorities 114 (Step 312). The geospatial location data can include one or more of: a country indication, a state indication, a street address, a floor designation, a room designation, and a floorplan indication. An example of such a floorplan 700 indication can be seen in FIG. 7

Figure 7:
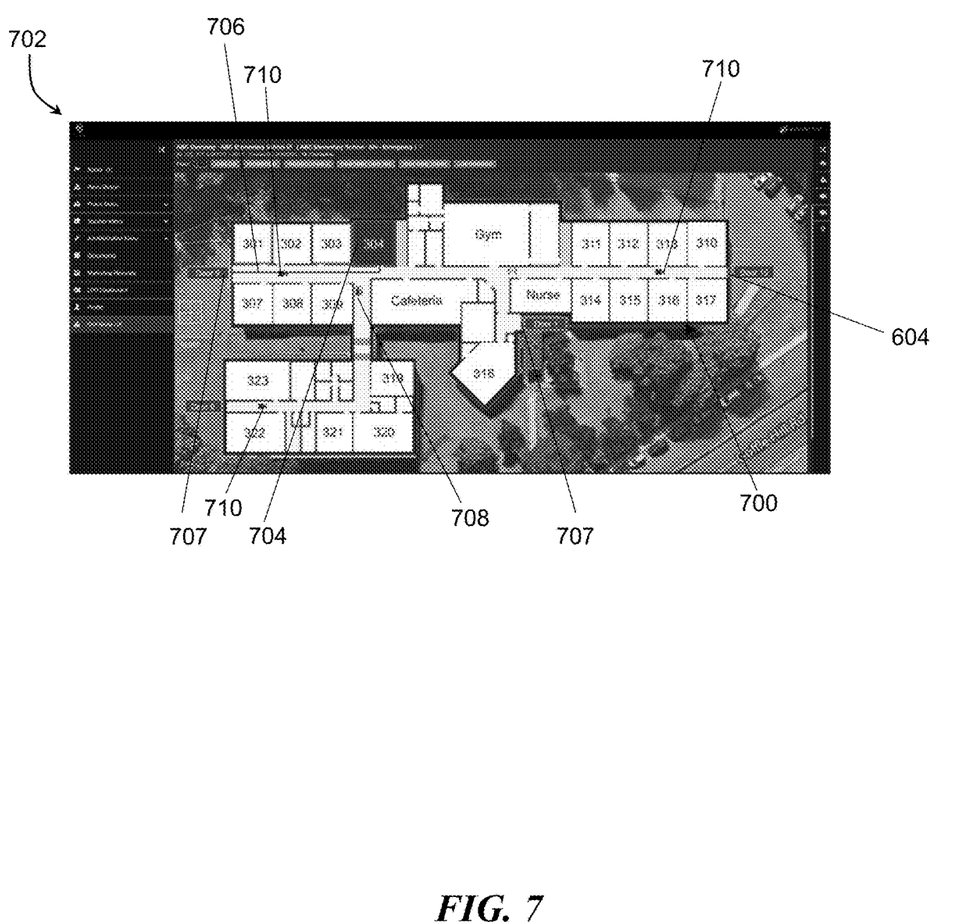
FIG. 7 is a diagrammatic illustration of an example interactive map showing the location of an extension that has activated its threat indication mechanism.

An interactive map 702 of FIG. 7 shows the geospatial location 704 of the extension 108 from which a threat notification 118 was received. Here the geospatial location 704 of the extension 108 (and potentially, user 112) is shown as being in "room #304" of the floorplan 700 as indicated by being colored red. An identified escape route 706 is shown as a red line leading to an exit 707. In certain embodiments, such as shown here, the interactive map 702 may further include indications of fire/emergency resources 708, and surveillance video 710. If there is remotely accessible surveillance video 710 at the location, access to the remotely accessible surveillance video 710 may also be provided as part of the interactive map 702. Other indicators and features will be apparent to one skilled in the art given the benefit of this disclosure.

Figure 8:
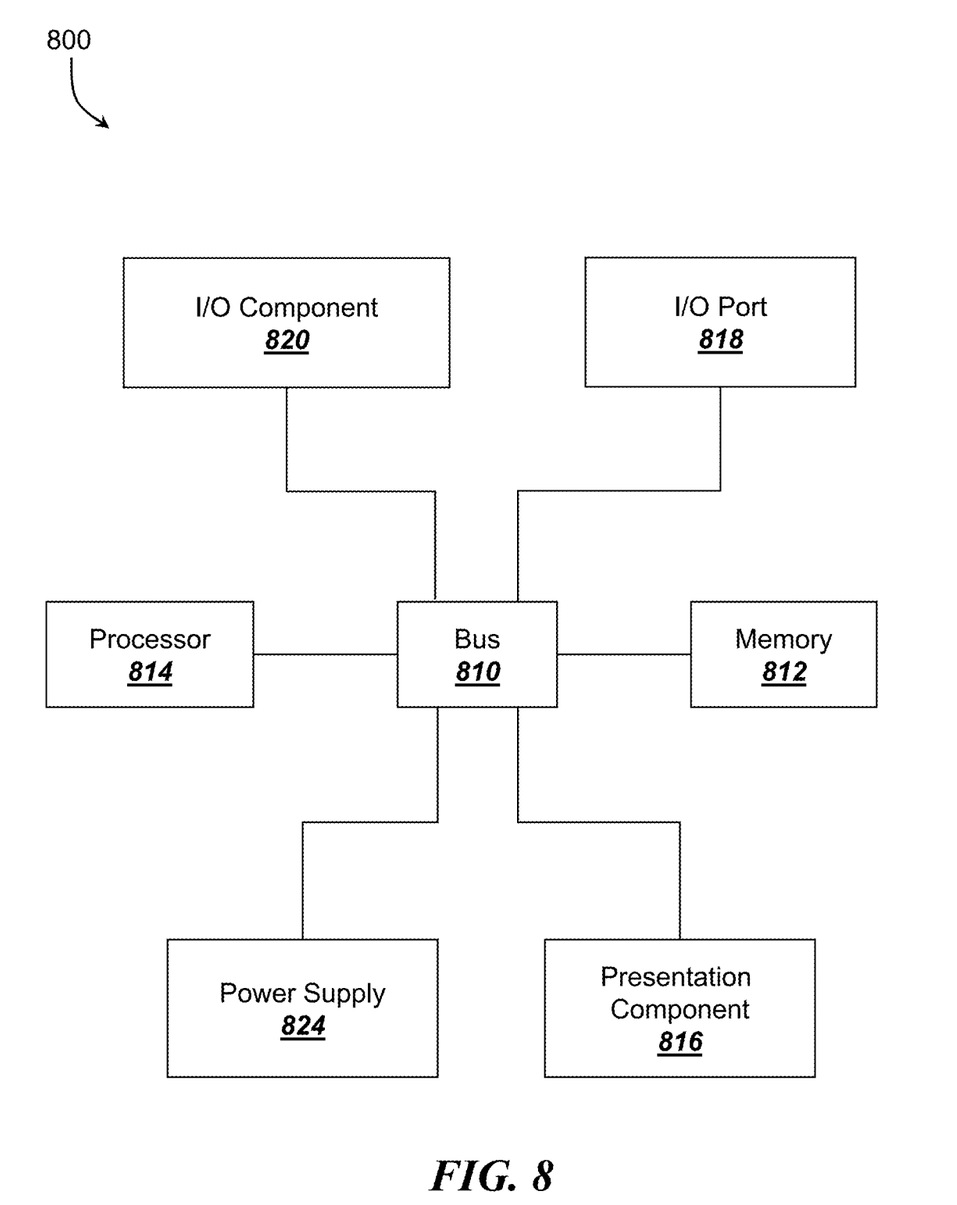
FIG. 8 is a diagrammatic illustration of a high-level architecture configured for implementing processes in accordance with aspects of the invention.

One illustrative example of a computing device 800 used to provide the functionality of the present invention, such as provided by the client system 102, service provider system 104, caller 110, or authorities 114. The computing device 800 is merely an illustrative example of a suitable special-purpose computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 800 is depicted for illustrative purposes, embodiments of the present invention may utilize any number of computing devices 800 in any number of different ways to implement a single embodiment of the present invention. Accordingly, embodiments of the present invention are not limited to a single computing device 800, as would be appreciated by one with skill in the art, nor are they limited to a single type of implementation or configuration of the example computing device 800.

The computing device 800 can include a bus 810 that can be coupled to one or more of the following illustrative components, directly or indirectly: a memory 812, one or more processors 814, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 800 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors 814 that read data from components such as the memory 812, the various I/O components 816, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a camera, microphones, joystick, recording device, game pad, satellite dish, scanner, printer, wireless device, networking device, and the like.

The power supply 824 can include batteries. Other suitable power supply or batteries will be apparent to one skilled in the art given the benefit of this disclosure.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for identifying a telephone caller as a threat and providing call details to authorities, the system comprising;
 a client system having a voice over internet protocol (VoIP) or MLTS multi-line telephone system providing one or more telephone extensions having a threat indication feature that when activated by a user initiates a threat notification; and
 a service provider system supporting the voice over internet protocol (VoIP) or MLTS multi-line telephone system, the service provider system configured to:
  receive the user initiated threat notification from one of the one or more telephone extensions indicating that the caller to the one or one or more telephone extensions is a threat; and in response to receiving the threat notification, automatically implementing a threat response process comprising:

at the time of the call:
  initiate an emergency notification to authorities;
  initiate a trace on the call from the caller; and
  initiate an audio recording of the call between the user and the caller; and upon completion of the call:
  create a voiceprint of the caller indicated as a threat; and
  create a transcript of the call between the user and the caller;

wherein activating the threat indication feature on one of the one or more telephone extensions triggers the threat notification, which causes implementation of the threat response process.

2. The system of claim 1, wherein the threat indication feature is a threat button provided on the telephone connected to the extension.

3. The system of claim 2, wherein the threat button is a software-implemented button, a hardware-implemented button, or a combination thereof.

4. The system of claim 1, wherein the service provider system is further configured to:

provide the authorities with one or more of:
  results of the call trace;
  the audio recording of the call;
  the voiceprint of the caller; and
  the transcript of the call.

5. The system of claim 4, wherein an email is sent to the authorities containing a file of or a link to one or more of results of the call trace, the audio recording of the call, the voiceprint of the caller, and the transcript of the call.

6. The system of claim 1, wherein the service provider system is further configured to store one or more of:
  results of the call trace;
  the audio recording of the call;
  the voiceprint of the caller; and
  the transcript of the call.

7. The system of claim 1, wherein the call trace comprises a network trace.

8. The system of claim 1, wherein the service provider system comprises a location service provider system configured to:
  maintain a location database containing geospatial location data for the one or more telephone extensions; and
  provide geospatial location data for the extension indicating a threat to the authorities.

9. The system of claim 1, wherein the authorities comprise one or more of a police department, fire department, emergency responder system, investigation agency, and security agency.

10. A method for identifying a telephone caller as a threat and providing call details to authorities, the method comprising:

providing a voice over internet protocol (VoIP) or MLTS multi-line telephone system having one or more extensions having a threat indication feature that when activated by a user initiates a threat notification;

receiving the user initiated threat notification from one of the one or more telephone extensions indicating that the caller to the one or more telephone extensions is a threat; and in response to receiving the threat notification, automatically implementing a threat response process comprising:

at the time of the call:
  initiating an emergency notification to authorities;
  initiating a trace on the call from the caller; and
  initiating an audio recording of the call between the user and the caller;

upon completion of the call:
  creating a voiceprint of the caller indicated as a threat; and
  create a transcript of the call between the user and the caller;

wherein activating the threat indication feature on one of the one or more telephone extensions triggers the threat notification, which causes implementation of the threat response process.

11. The method of claim 10, wherein the threat indication feature is a threat button provided on the telephone connected to the extension.

12. The method of claim 11, wherein the threat button is a software-implemented button, a hardware-implemented button, or a combination thereof.

13. The method of claim 10, further comprising:
providing the authorities with one or more of:
  results of the call trace;
  the audio recording of the call;
  the voiceprint of the caller; and
  the transcript of the call.

14. The method of claim 13, wherein an email is sent to the authorities containing a file of or a link to one or more of results of the call trace, the audio recording of the call, the voiceprint of the caller, and the transcript of the call.

15. The method of claim 10, further comprising:
storing one or more of:
  results of the call trace;
  the audio recording of the call;
  the voiceprint of the caller; and
  the transcript of the call.

16. The method of claim 10, wherein the call trace comprises a network trace.

17. The method of claim 10, further comprising:
maintaining a location database containing geospatial location data for the one or more telephone extensions; and
providing geospatial location data for the extension indicating a threat to the authorities.

18. The method of claim 10, wherein the authorities comprise one or more of a police department, fire department, emergency responder, investigation agency, and security agency.

19. The method of claim 10, further comprising registering a client system.

* * * * *